(12) United States Patent
Shoji

(10) Patent No.: US 8,288,709 B2
(45) Date of Patent: Oct. 16, 2012

(54) OPTICAL ENCODER DEVICE

(75) Inventor: Yoshihiro Shoji, Tokyo (JP)

(73) Assignee: Sanyo Denki Co., Ltd., Tokyo (JP)

( * ) Notice: Subject to any disclaimer, the term of this patent is extended or adjusted under 35 U.S.C. 154(b) by 312 days.

(21) Appl. No.: 12/846,101

(22) Filed: Jul. 29, 2010

(65) Prior Publication Data

US 2011/0024652 A1    Feb. 3, 2011

(30) Foreign Application Priority Data

Jul. 29, 2009  (JP) ................................. 2009-177088
Jul. 27, 2010  (JP) ................................. 2010-167794

(51) Int. Cl.
*G01D 5/34*        (2006.01)

(52) U.S. Cl. ................. 250/231.13; 250/231.16; 341/11; 356/616; 33/707

(58) Field of Classification Search .............. 250/231.13, 250/231.14, 231.16, 231.17, 231.18, 237 G; 341/11, 13; 356/614–617; 33/707
See application file for complete search history.

(56) References Cited

U.S. PATENT DOCUMENTS

| | | | |
|---|---|---|---|
| 4,663,588 A | 5/1987 | Himuro et al. | |
| 5,068,530 A | 11/1991 | Ieki et al. | |
| 5,182,613 A | 1/1993 | Ieki et al. | |
| 5,748,373 A | 5/1998 | Hane et al. | |
| 5,801,378 A | 9/1998 | Hane et al. | |
| 5,889,280 A | 3/1999 | Matsuura | |
| 7,057,160 B2* | 6/2006 | Ito ............................ | 250/231.13 |
| 2011/0036970 A1* | 2/2011 | Shoji et al. ................ | 250/214 R |

FOREIGN PATENT DOCUMENTS

| | | |
|---|---|---|
| EP | 0714015 A2 | 5/1996 |
| JP | 60-042616 A | 3/1985 |
| JP | 2539269 | 7/1996 |
| JP | 3184419 | 4/2001 |
| JP | 2007-218603 | 8/2007 |

* cited by examiner

*Primary Examiner* — Kevin Pyo
(74) *Attorney, Agent, or Firm* — Rankin, Hill & Clark LLP

(57) ABSTRACT

An optical encoder device is provided, in which first light transmissive slits are formed in a movable slit plate and second light transmissive slits are formed in a stationary slit plate. The number of the second light transmissive slits is defined as S. The second light transmissive slits are formed in the stationary slit plate such that when one of the second light transmissive slits is optically coincident with one of the first light transmissive slits, the remaining S-1 second light transmissive slits are shifted in position from other first light transmissive slits corresponding to the remaining second light transmissive slits by S-1 phase differences.

20 Claims, 9 Drawing Sheets

OPTICAL ENCODER DEVICE

TECHNICAL FIELD

The present invention relates to an optical encoder device that provides an output signal with little distortion.

BACKGROUND ART

Optical encoders are roughly grouped into transmissive optical encoders using light that transmits through a movable member formed with slits and including a light transmissive portion and a non-transmissive portion, and reflective optical encoders using light reflected by a movable member formed with slits and including a light reflective portion and a non-reflective portion. Among the transmissive and reflective optical encoders, some optical encoders use a stationary member formed with slits and including a light transmissive portion and a non-transmissive portion that are disposed such that light incident on a light receiving element disposed to face the movable member varies in accordance with displacement of the movable member. Other optical encoders do not use a stationary member formed with slit, but include a plurality of light receiving elements disposed in such an arrangement pattern that the light receiving elements serve as a stationary member. In optical encoder devices, a signal is generated in accordance with the amount of transmitted light or reflected light determined by the relationship between the pattern of the slits in the movable member and the pattern of the slits in the stationary member or the pattern of the light receiving elements. The generated signal is multiplied to obtain a signal with a higher resolution. In order to obtain a high-precision signal, it is desirable that the original signal to be multiplied should have a sinusoidal waveform. However, the slits in the stationary member or the light receiving elements according to the related art are disposed at intervals equal to the pitch or cycle P of the slits in the movable member. The signal generated with such a pattern of the slits in the stationary member or the light receiving elements theoretically has a triangular waveform which involves significant distortion. Such distortion is caused by high-order components, rather than a fundamental-wave component. A third harmonic wave has an amplitude of about 11%, a fifth harmonic wave has an amplitude of about 4%, and a seventh harmonic wave has an amplitude of about 2%, with respect to the fundamental-wave component. The distortion rate represented by the root mean square of the ratio of the harmonic-wave components (for example, calculated up to the 27th harmonic wave) to the fundamental-wave component is as high as 12.11%.

In order to address this issue, various attempts have been made on the intervals between the slits in the stationary member or the plurality of light receiving elements. According to Japanese Patent Application Publication No. 60-42616 (JP60-42616A), a phase difference of 1/6 is provided between two slits to cancel a third harmonic wave.

According to Japanese Patent No. 2539269 (JP2539269), a phase difference of 1/6 or 1/10 is provided between two slits or slit groups to cancel a third or fifth harmonic wave.

Japanese Patent No. 3184419 (JP3184419) improves the technique disclosed in JP2539269, and $2^x$ or more slits are disposed to cancel x orders of harmonic waves.

According to Japanese Patent Application Publication No. 2007-218603 (JP2007-218603A), a phase difference of 1/12 is provided between four slits to cancel a third harmonic wave.

JP2007-218603A teaches a known example of an optical encoder device that provides an output signal with little distortion. In the known optical encoder device, slits provided in a stationary slit plate are divided into units having a phase difference of 1/12 of the pitch P of slits in a movable slit plate and each including light transmissive slits of which the number is a multiple of four. Defining the phase of a first unit of the light transmissive slits as a reference, the first and second units of the light transmissive slits are shifted in phase by P/12, the second and third units of the light transmissive slits are shifted in phase by P/6, and the third and fourth units of the light transmissive slits are shifted in phase by P/4.

JP60-42616A teaches an optical encoder in which a phase difference of 1/6 is provided between two slits to cancel a third harmonic wave.

JP2539269 teaches an optical encoder in which a phase difference of 1/6 or 1/10 is provided between two slits or slit groups to cancel a third harmonic wave or a fifth harmonic wave.

JP3184419 describes that x orders of harmonic waves are canceled by using $2^x$ or more slits.

According to the techniques disclosed in JP60-42616A, JP2539269, and JP2007-218603A, the distortion rate is significantly reduced to 4.63%, 1.59%, and 1.60%, respectively, with respect to the original waveforms. The obtained waveform, however, still involves distortion with a distortion rate of 1.55% or higher.

In designing optical encoders, the number of slits in a stationary member or the number of light receiving elements is determined to provide a desired number of pulses in consideration of constraints on the length of the light receiving element pattern, the length of the light receiving elements, and the gap between the light receiving elements, the intensity of the light source, the diameter (for rotary optical encoders), and so forth.

According to the technique disclosed in JP3184419, the distortion rate is reduced to 0.79% when the number of slits is eight. In order to further reduce the distortion rate, however, it is necessary to increase the number of slits to 16, 32, and so forth by multiplying the number by 2, which makes it difficult to develop a design that effectively uses the length of the light receiving pattern and so forth discussed above.

SUMMARY OF INVENTION

An object of the present invention is to provide an optical encoder device in which the number of slits formed in a stationary member or light receiving elements may be freely determined, and which additionally provides an output signal with a lower distortion rate than ever. A transmissive optical encoder device according to a first embodiment of the present invention includes a light emitting element, a light receiving element disposed to face the light emitting element, a movable slit plate, and a stationary slit plate.

The movable slit plate is disposed between the light emitting element and the light receiving element, and includes a first slit row in which a plurality of first light transmissive slits each having a predetermined slit width and a plurality of first light non-transmissive slits each having a predetermined slit width are alternately formed in a moving direction of the movable slit plate at a constant pitch or cycle P. The stationary slit plate is disposed between the light emitting element and the light receiving element, and includes one or more second slit rows in which a plurality of second light transmissive slits each having a predetermined slit width and a plurality of second light non-transmissive slits each having a predetermined slit width are alternately formed. The light transmissive slits may arbitrarily be formed as long as they may transmit light, and are not limited to through holes. The light transmissive slits may be provided by forming a plurality of window portions that transmit light in a light non-transmissive substrate. Also, the light non-transmissive slits are not necessarily physical slits, and may arbitrarily be formed as long as they may not transmit light. For example, the light non-transmissive slits may be formed by forming a film that does not transmit light on a light transmissive substrate. The term "moving direction" used herein means the direction in which the movable slit plate moves with respect to the stationary slit plate. The term "width direction" used herein moans the direction orthogonal to the moving direction and the direction in which light transmits.

In the present invention, it is assumed that the number S of the plurality of second light transmissive slits formed in the stationary slit plate is S=n×n' where n is an integer of 2 or more and n' is an integer of 2 or more except for a combination of n=2 and n'=2 and a combination of n=3 and n'=2, the value of a is an integer of $0 \leq a \leq n-1$, and the value of b is an integer of $0 \leq b \leq n'-1$. Then, the plurality of second light transmissive slits are formed in the stationary slit plate such that when one of the second light transmissive slits is optically coincident with one of the first light transmissive slits formed in the movable slit plate (in other words, when all the light that has transmitted through one of the first light transmissive slits in the movable slit plate transmits through one of the second light transmissive slits in the stationary slit plate), the remaining S-1 second light transmissive slits are shifted in position from other first light transmissive slits corresponding to the remaining second light transmissive slits by S-1 phase differences represented by P×[a/(3×n)+b/(5×n')] where the value of a and the value of b are in different combinations. For example, when n=2 and n'=3, the value of a is $0 \leq a \leq 1$ (that is, the value of a is 0 or 1), and the value of b is $0 \leq b \leq 2$ (that is, the value of b is 0, 1, or 2). Under such conditions, S-1 (=5) phase differences are obtained as follows: P×[0/(3×2)+1/(5×3)]=P×[1/15], P×[0/(3×2)+2/(5×3)]=P×[2/15], P×[1/(3×2)+0/(5×3)]=P×[1/6], P×[1/(3×2)+1/(5×3)]=P×[1/6+1/15], and P×[1/(3×2)+2/(5×3)]=P×[1/6+2/15]. Therefore, by implementing the present invention, the S second light transmissive slits in the stationary slit plate are respectively shifted in position from the corresponding first light transmissive slits in the movable slit plate by phase differences of 0, P×[1/15], P×[2/15], P×[1/6], P×[1/6+1/15], and P×[1/6+2/15]. To determine the positions of the S second light transmissive slits in the stationary slit plate, the phase differences may be subtracted from or added to the pitch P.

By determining the positions of the S second light transmissive slits in the stationary slit plate according to the present invention, it will be possible to freely determine the number of second light transmissive slits, and additionally to output an optical signal that does not contain a third harmonic wave or a fifth harmonic wave. As a result, the distortion of the output optical signal may be reduced more than ever.

The stationary slit plate may include one second slit row, or may include a plurality of second slit rows arranged in a width direction orthogonal to the moving direction. In particular, when a plurality of second slit rows are arranged in the width direction, the usable length of the light receiving surface of the light receiving element may be shortened compared with when the same number S of slits are disposed in one row. Also, the utilization of the light receiving element may be maximized by maximally utilizing the length and the width of the light receiving surface of the light receiving element. The same first light transmissive slits provided in the movable slit plate may be used for both situations where one second slit row is provided and a plurality of second slit rows are provided.

A transmissive optical encoder device according to a second embodiment of the present invention does not use a stationary slit plate, but uses a plurality of light receiving elements arranged in a pattern to provide the same effect as the transmissive optical encoder device of the first embodiment as discussed above. The transmissive optical encoder device of the second embodiment includes a light emitting element, a movable slit plate, and a light receiving element array. The movable slit plate includes a slit row in which a plurality of light transmissive slits each having a predetermined slit width, which transmit light from the light emitting element, and a plurality of light non-transmissive slits each having a predetermined slit width are alternately formed in a moving direction of the movable slit plate at a constant pitch or cycle P. The light receiving element array includes a light receiving element row in which a plurality of light receiving elements and a plurality of portions, where no light receiving elements exist, are alternately formed. The light receiving elements each have a predetermined pattern width and receive the light having transmitted through the plurality of light transmissive slits. The portions where no light receiving elements exist each have a predetermined pattern width. Then, in this configuration, defining the number S of the plurality of light receiving elements in the light receiving element array as S=n×n' where n is an integer of 2 or more and n' is an integer of 2 or more except for a combination of n=2 and n'=2 and a combination of n=3 and n'=2, the value of a as an integer of $0 \leq a \leq n-1$, and the value of b as an integer of $0 \leq b \leq n'-1$, the plurality of light receiving elements are formed in the light receiving element array such that when one of the light receiving elements is optically coincident with one of the light transmissive slits in the movable slit plate, the remaining S-1 light receiving elements are shifted in position from other light transmissive slits corresponding to the remaining light receiving elements by S-1 phase differences represented by P×[a/(3×n)+b/(5×n')] where the value of a and the value of b are in different combinations. The light receiving element array may include one light receiving element row, or may include a plurality of light receiving element rows arranged in a width direction orthogonal to the moving direction.

A reflective optical encoder device according to a first embodiment of the present invention includes a light emitting element, a light receiving element, a movable pattern plate, and a stationary slit plate. The movable pattern plate includes a reflective pattern row in which a plurality of reflective patterns each having a predetermined pattern width, which reflect light from the light emitting element, and a plurality of non-reflective patterns each having a predetermined pattern width are alternately formed in a moving direction of the movable pattern plate at a constant pitch or cycle P'. The stationary slit plate is disposed between the movable pattern plate and the light receiving element, and includes one or more slit rows in which a plurality of light transmissive slits each having a predetermined slit width and a plurality of light non-transmissive slits each having a predetermined slit width are alternately formed.

In the present invention, the number S of light transmissive slits formed in the stationary slit plate is defined as S=n×n' where n is an integer of 2 or more and n' is an integer of 2 or more except for a combination of n=2 and n'=2 and a combination of n=3 and n'=2, the value of a is defined as an integer of $0 \leq a \leq n-1$, the value of b is defined as an integer of $0 \leq b \leq n'-1$, and the pitch of a plurality of optical images projected onto the stationary slit plate by the plurality of reflective patterns in the movable pattern plate is defined as P. Then, the plurality of light transmissive slits are formed in the stationary slit plate such that when one of the light transmissive slits is optically coincident with one of the optical images projected by one of the reflective patterns in the movable pattern plate, the remaining S−1 light transmissive slits are shifted in position from other optical images projected by other reflective patterns corresponding to the remaining light transmissive slits by S−1 phase differences represented by $P \times [a/(3 \times n) + b/(5 \times n')]$ where the value of a and the value of b are in different combinations. The reflective optical encoder device of the first embodiment thus configured may also provide the same effect as the transmissive optical encoder device of the first embodiment. Also, in this configuration, the one or more slit rows may include one slit row, or may include a plurality of slit rows arranged in a width direction orthogonal to the moving direction.

A reflective optical encoder device according to a second embodiment of the present invention does not use a stationary slit plate, but uses a plurality of light receiving elements arranged in a pattern to provide the same effect as the reflective optical encoder device of the first embodiment discussed above. The reflective optical encoder device of the second embodiment includes a light emitting element, a movable pattern plate, and a light receiving element array. The movable pattern plate is the same as the movable pattern plate of the reflective optical encoder device of the first embodiment discussed above. The light receiving element array includes a light receiving element row in which a plurality of light receiving elements each having a predetermined pattern width, which receive the light reflected from the plurality of reflective patterns, and a plurality of portions, where no light receiving elements exist, each having a predetermined pattern width are alternately formed in the moving direction. The light receiving element array may include a plurality of light receiving element rows arranged in a width direction orthogonal to the moving direction. Also, in this configuration, the number S of the plurality of light receiving elements in the light receiving element array is defined as $S = n \times n'$ where n is an integer of 2 or more and n' is an integer of 2 or more except for a combination of n=2 and n'=2 and a combination of n=3 and n'=2, the value of a is defined as an integer of $0 \leq a \leq n-1$, the value of b is defined as an integer of $0 \leq b \leq n'-1$, and the pitch of optical images projected by the plurality of reflective patterns in the movable pattern plate on a surface of the light receiving element array is defined as P. Then, the plurality of light receiving elements are formed in the light receiving element array such that when one of the light receiving elements is optically coincident with one of the optical images projected by one of the reflective patterns in the movable pattern plate, the remaining S−1 light receiving elements are shifted in position from other optical images projected by other reflective patterns corresponding to the remaining light receiving elements by S−1 phase differences represented by $P \times [a/(3 \times n) + b/(5 \times n')]$ where the value of a and the value of b are in different combinations.

DESCRIPTION OF EMBODIMENTS

Figure 1:
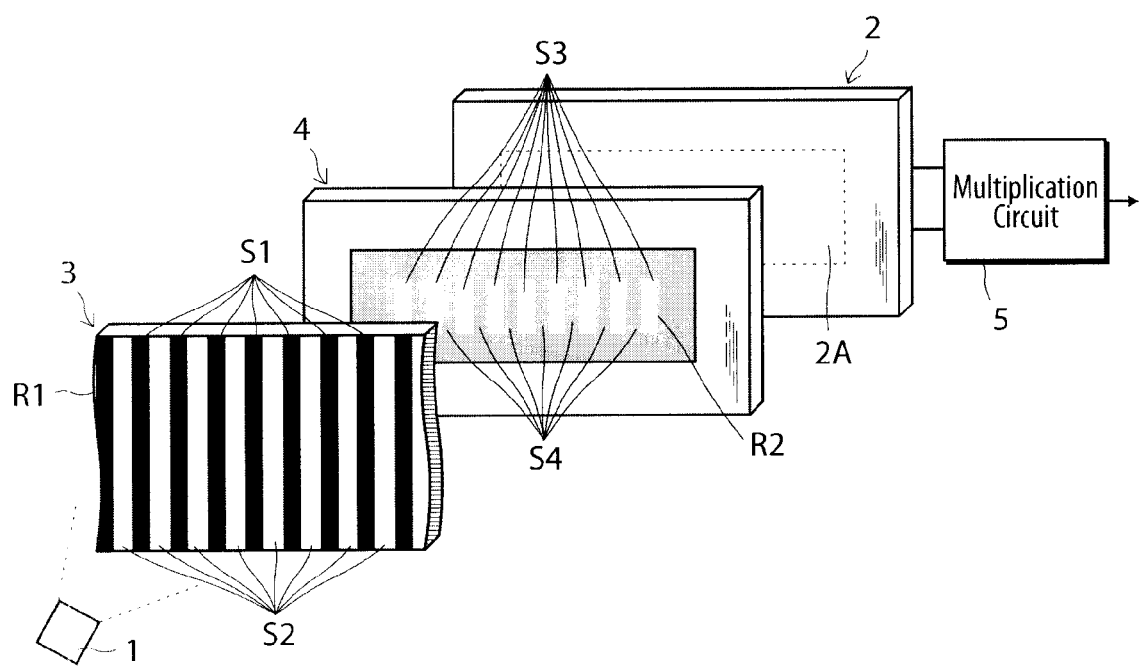
FIG. 1 is a perspective view schematically showing an exemplary transmissive optical encoder device according to a first embodiment of the present invention.

Embodiments of an optical encoder device according to the present invention will now be described in detail below with reference to the accompanying drawings. FIG. 1 is a perspective view schematically showing a transmissive optical encoder device according to a first embodiment of the present invention. In FIG. 1, reference numeral 1 denotes a light emitting element formed by a light emitting diode or the like, and reference numeral 2 denotes a light receiving element formed by a semiconductor substrate having a function of converting an optical signal into an electrical signal and outputting the electrical signal. A movable slit plate 3 and a stationary slit plate 4 fixed to a stationary portion (not shown) are disposed between the light emitting element 1 and the light receiving element (photoelectric conversion element) 2. The movable slit plate 3 is a rectangular plate in FIG. 1, but the present invention is also applicable to a circular rotary movable slit plate. In the present embodiment, a multiplication circuit 5 is provided to electrically multiply the electrical signal output from the light receiving element 2. In such a configuration, when the light emitting element 1 emits parallel light beams, light transmits through first light transmissive slits S2 in the movable slit plate 3 and second light transmissive slits S31 to S39 (see FIG. 2) in the stationary slit plate 4, which will be discussed later, and then is incident on the light receiving element 2. The light receiving element 2 then converts the incident light into an electrical signal in accordance with the intensity of light and outputs the electrical signal. The electrical signal is obtained in accordance with variations in amount of light which has been transmitted through the first light transmissive slits S2 in the movable slit plate 3 and the second light transmissive slits S31 to S39 in the stationary slit plate 4.

Figure 2:
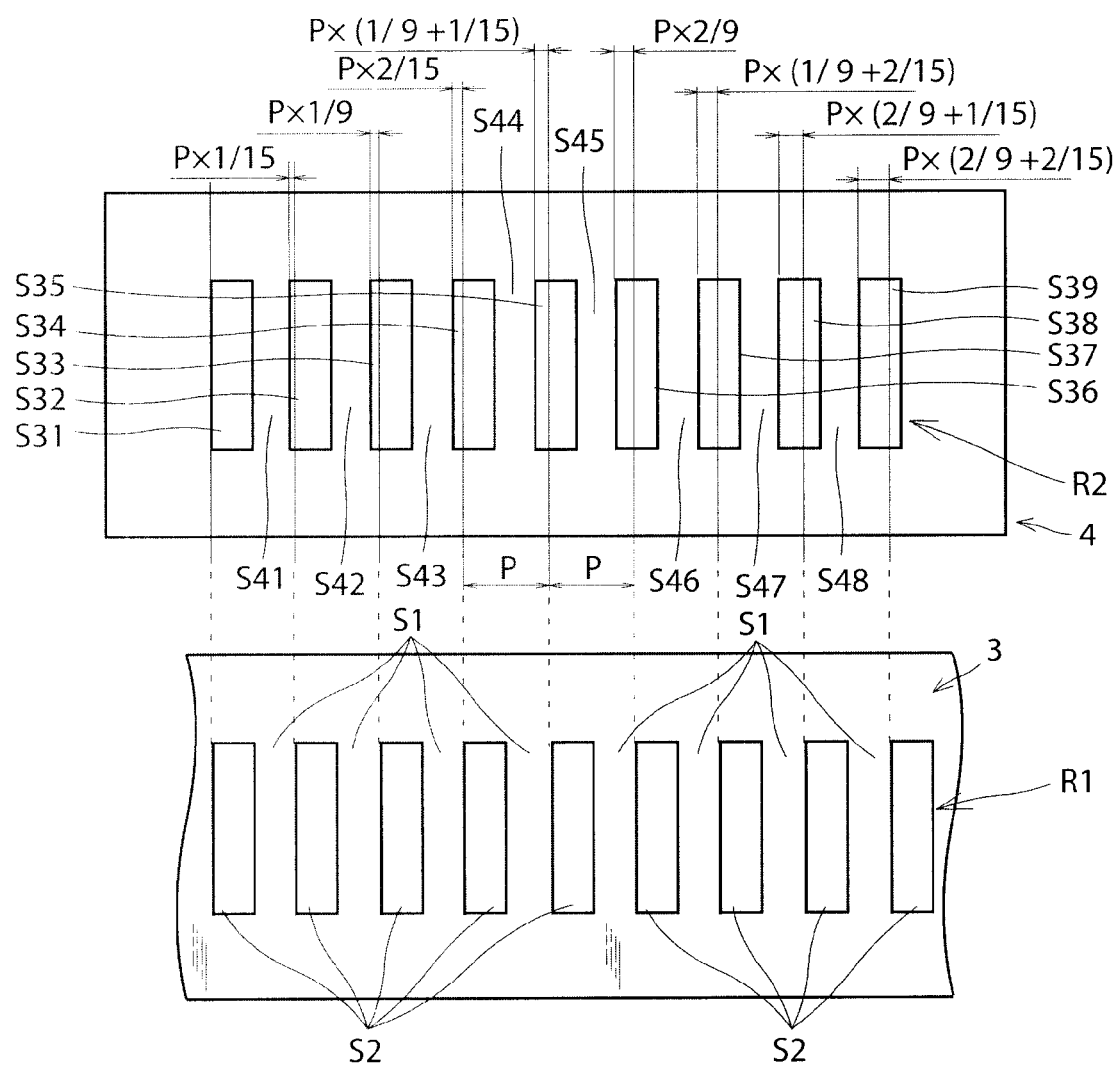
FIG. 2 is a conceptual illustration of a stationary slit plate in which the intervals between slits are changed according to the embodiment.

As shown in FIG. 2, the movable slit plate 3 includes a first slit row R1 in which a plurality of first light transmissive slits (portions that transmit light) S2 each having a slit width corresponding to a half of P (P/2) and a plurality of first light non-transmissive slits (portions that do not transmit light) S1 each having a slit width corresponding to a half of P (P/2) are alternately formed. As shown in FIG. 2, the first light transmissive slits S2 and the first light non-transmissive slits S1 are alternately formed at a constant pitch or cycle P.

The stationary slit plate 4 is formed on the assumption that the number S of the plurality of second light transmissive slits formed in the stationary slit plate 4 is S=n×n' where n is an integer of 2 or more and n' is an integer of 2 or more except for a combination of n=2 and n'=2 and a combination of n=3 and n'=2, the value of a is an integer of 0≦a≦n−1, and the value of b is an integer of 0≦b≦n'−1. Then, the plurality of second light transmissive slits are formed in the stationary slit plate 4 such that when one of the second light transmissive slits (in FIG. 2, S31) is optically coincident with one of the first light transmissive slits S2 formed in the movable slit plate 3, the remaining S−1 second light transmissive slits S32 to S39 are shifted in position from other first light transmissive slits S2 corresponding to the remaining second light transmissive slits S32 to S39 by S−1 phase differences represented by P×[a/(3×n)+b/(5×n')] where the value of a and the value of b are in different combinations. S41-S48 designate light non-transmissive slits which do not transmit light.

In FIG. 2, n=3 and n'=3. Thus, the value of a is 0 a 2 (that is, the value of a is 0, 1, or 2), and the value of is 0≦b≦2 (that is, the value of b is 0, 1, or 2). Under such conditions, the S−1 (=8) phase differences are obtained as follows: P×[0/(3×3)+1/(5×3)]=P×[1/15], P×[0/(3×3)+2/(5×3)]=P×[2/15], P×[1/(3×3)+0/(5×3)]=P×[1/9], P×[1/(3×3)1/(5×3)]=P×[1/9+1/15], P×[1/(3×3)+2/(5×3)]=P×[1/9+2/15], P×[2/(3×3)+0/(5×3)]=P×[2/9], P×[2/(3×3)+1/(5×3)]=P×[2/9+1/15], and P×[2/(3×3)+2/(5×3)]=P×[2/9+2/15]. Therefore, by implementing the present invention, the S second light transmissive slits in the stationary slit plate are respectively shifted in position from the corresponding first light transmissive slits in the movable slit plate by phase differences of 0, P×[1/15], P×[2/15], P×[1/9], P×[1/9+1/15], P×[1/9+2/15], P×[2/9], P×[2/9+1/15], and P×[2/9+2/15]. In FIG. 2, such eight phase differences are each subtracted from the pitch or cycle P to determine the positions of the nine second light transmissive slits in the stationary slit plate 4. That is, when the pitch of the first slits in the movable slit plate is defined as P: the second light transmissive slit 332 is formed to start from a position P−P×[1/15] and have a width corresponding to P/2; the second light transmissive slit S33 is formed to start from a position 2P−P×[1/9] and have a width corresponding to P/2; the second light transmissive slit S34 is formed to start from a position 3P−P×[2/15] and have a width corresponding to P/2; the second light transmissive slit S35 is formed to start from a position 4P−P×[1/9+1/15] and have a width corresponding to P/2; the second light transmissive slit 336 is formed to start from a position 5P−P×[2/9] and have a width corresponding to P/2; the second light transmissive slit S37 is formed to start from a position 6P−P×[1/9+2/15] and have a width corresponding to P/2; the second light transmissive slit S38 is formed to start from a position 7P−P×[2/9+1/15] and have a width corresponding to P/2; and the second light transmissive slit S39 is formed to start from a position 8P−P×[2/9+2/15] and have a width corresponding to P/2. In this embodiment, the positions of the second light transmissive slits S31 to S39 are determined such that the phase differences successively increase along the moving direction. However, the arrangement of the second light transmissive slits S31 to S39 is not limited to the arrangement according to this embodiment, and any arrangement may be used as long as the respective second light transmissive slits have such phase differences as defined above.

In respect of the respective second light transmissive slits provided in the stationary slit plate 4, defining an N-th order signal component produced by one second light transmissive slit with a=0 and b=0 (S31 in FIG. 2) as $k_N \cos N\theta$, the other second light transmissive slits produce signals with phase differences corresponding to the phase differences of the slits.

The sum of the signals will be calculated by the following expression:

$$A_N = \sum_{b=0}^{n'-1} \sum_{a=0}^{n-1} k_N \cos N\left(\theta + \frac{a}{3n}P + \frac{b}{5n'}P\right) \quad \text{[Expression 1]}$$

Using the above expression where n=3 and n'=3 as in the embodiment of FIG. 2, the sum of the signals produced by the nine second light transmissive slits is obtained as follows:

$$\begin{aligned}A_N &= k_N \begin{pmatrix} \cos N\theta + \cos N\left(\theta + \frac{1}{9}P\right) + \cos N\left(\theta + \frac{1}{15}P\right) + \\ \cos N\left(\theta + \frac{1}{9}P + \frac{1}{15}P\right) + \cos N\left(\theta + \frac{2}{9}P\right) + \\ \cos N\left(\theta + \frac{2}{15}P\right) + \cos N\left(\theta + \frac{2}{9}P + \frac{1}{15}P\right) + \\ \cos N\left(\theta + \frac{1}{9}P + \frac{2}{15}P\right) + \cos N\left(\theta + \frac{2}{9}P + \frac{2}{15}P\right) \end{pmatrix} \\ &= k_N \times \left(1 + 2\cos N\left(\frac{P}{9}\right)\right) \times \left(1 + 2\cos N\left(\frac{P}{15}\right)\right) \times \\ &\quad \cos N\left(\theta + \frac{P}{9} + \frac{P}{15}\right) \end{aligned} \quad \text{[Expression 2]}$$

Hence, with N=3, the term below results in a value of 0:

$$1 + 2\cos 3\left(\frac{P}{9}\right) = 1 + 2 \times -\frac{1}{2} = 0 \quad \text{[Expression 3]}$$

Also, with N=5, the term below results in a value of 0:

$$1 + 2\cos 5\left(\frac{P}{15}\right) = 1 + 2 \times -\frac{1}{2} = 0 \quad \text{[Expression 4]}$$

Thus, it is found that the resulting signal does not contain a third harmonic wave or a fifth harmonic wave.

Because the third harmonic wave is canceled by the phase differences of the n second light transmissive slits, and the fifth harmonic wave is canceled by the phase differences of the n' second light transmissive slits, the synthesized signal does not contain a third-order signal or a fifth-order signal. Further, harmonic waves, the orders of which are larger than five, are also reduced by the phase differences of the signals produced by the second light transmissive slits, to an amplitude lower than the signals before the synthesis. It is a matter of course that the order of the second light transmissive slits in the horizontal direction in the drawing paper may be determined as desired to obtain the same effect. The same effect may also be obtained by providing the second light transmissive slits with such phase differences that make the intervals between adjacent second light transmissive slits smaller or larger.

It is to be verified that the resulting signal does not contain a third harmonic wave or a fifth harmonic wave in a case with n=2 and n'=3.

That is, using the above expression for the sum, the sum of signals for six patterns is obtained as follows:

$$A_N = k_N \bigg( \cos N\theta + \cos N\bigg(\theta + \frac{1}{6}P\bigg) + $$
$$\cos N\bigg(\theta + \frac{1}{15}P\bigg) + \cos N\bigg(\theta + \frac{1}{6}P + \frac{1}{15}P\bigg) +$$
$$\cos N\bigg(\theta + \frac{2}{15}P\bigg) + \cos N\bigg(\theta + \frac{1}{6}P + \frac{2}{15}P\bigg)\bigg) =$$
$$k_N \times 2\cos N\bigg(\frac{P}{12}\bigg) \times \bigg(1 + 2\cos N\bigg(\frac{P}{15}\bigg)\bigg) \times$$
$$\cos N\bigg(\theta + \frac{P}{12} + \frac{P}{15}\bigg)$$

[Expression 5]

Hence, with N=3, the term below results in a value of 0:

$$2\cos3\bigg(\frac{P}{12}\bigg) = 0$$

[Expression 6]

Also, with N=5, the term below results in a value of 0:

$$1 + 2\cos5\bigg(\frac{P}{15}\bigg) = 1 + 2 \times -\frac{1}{2} = 0$$

[Expression 7]

Thus, it is found that the resulting signal does not contain a third harmonic wave or a fifth harmonic wave.

Table 1 below shows the distortion rate (the root mean square of the ratio of the harmonic-wave components up to the 27th harmonic wave to the fundamental-wave component) when implementing the present invention. According to Table 1, the distortion rate when n=2 and n'=3 is 0.93%, which is lower than the distortion rates when implementing according to JP60-42616A, JP2539269, and JP2007-218603A. It is also found that the present invention achieves a distortion rate of equal to or less than 1% using a smaller number of slits than JP3184419. For JP2539269, n=2 and n'=2. For JP3184419, the number of slits is four.

It is also found from Table 1 that the distortion rate may be different even though the number S=n×n' of second slits in the stationary slit plate or the number of light receiving elements is the same. This is because harmonic waves, the orders of which are larger than five, have different phase differences. It is found that the harmonic waves may be more effectively removed by setting such values of n and n' that provide a lower distortion rate for a desired number S of the second light transmissive slits in the stationary slit plate.

From Table 1 above, it is found that the distortion rate may be reduced to equal to or less than 1 with a small number of second light transmissive slits for any combination of n and n' where n is an integer of 2 or more and n' is an integer of 2 or more except for a combination of n=2 and n'=2 and a combination of n=3 and n'=2.

In the technique in this disclosure, it is necessary that the number S of the second light transmissive slits provided in the stationary slit plate should be a composite number. In the embodiment of FIGS. 1 and 2, there is only one second slit row in the stationary slit plate. Therefore, if the number of second light transmissive slits provided in the stationary slit plate, which is determined in accordance with the design constraint of optical encoders discussed above, is a prime number, it is necessary that the number S of the second light transmissive slits should be a composite number less than the prime number. In addition, if the number of the second light transmissive slits in the stationary slit plate, which is determined in accordance with the design constraint of optical encoders discussed above, is small, the distortion rate may not be sufficiently reduced.

Figure 3:
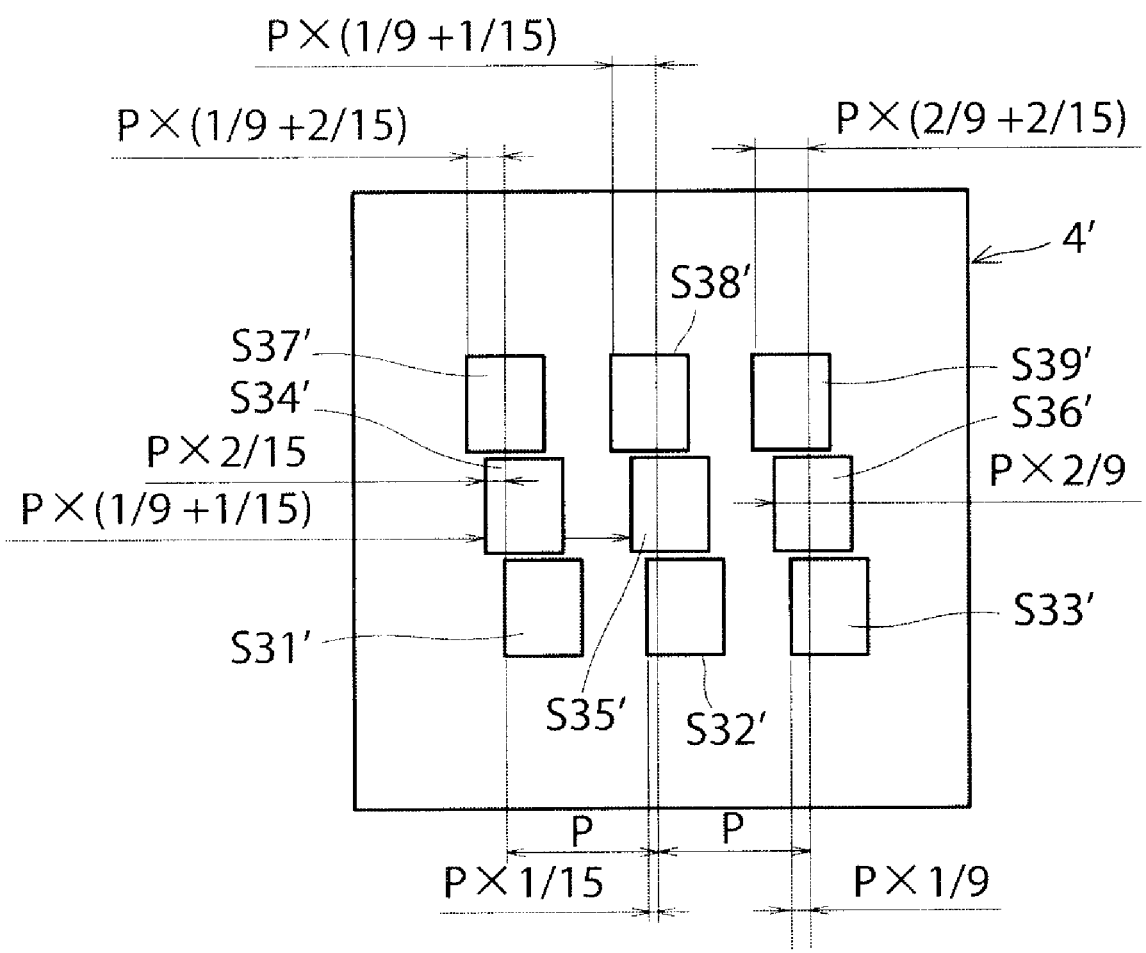
FIG. 3 is a plan view of a stationary slit plate in which a plurality of light transmissive slits are arranged in three slit rows disposed in the width direction orthogonal to the moving direction.

Thus, in a stationary slit plate 4' shown in FIG. 3, a plurality of second light transmissive slits S are distributed in three second light transmissive slit rows arranged in a width direction orthogonal to the moving direction. The movable slit plate used for the stationary slit plate 4' may be the same as the movable slit plate used in the embodiment of FIGS. 1 and 2.

In the stationary slit plate 4' according to the embodiment, nine second light transmissive slits S31' to S39' are arranged in three second light transmissive slit rows. The phase differences of the second light transmissive slits S31' to S39' are The same as the phase differences of the second light transmissive slits S31 to S39 shown in the embodiment of FIG. 2. In the example of FIG. 3, three second light transmissive slits S37' to S39' are disposed in the upper second light transmissive slit row in the drawing paper, three second light transmissive slits S34' to S36' are disposed in the middle second light transmissive slit row, and three second light transmissive slits S31' to S33' are disposed in the lower second light transmissive slit row. The phase differences of the second light transmissive slits included in the respective second light transmissive slit rows may be determined as desired, and the second light transmissive slits may not necessarily be arranged in the order in the example of FIG. 3.

Figure 4:
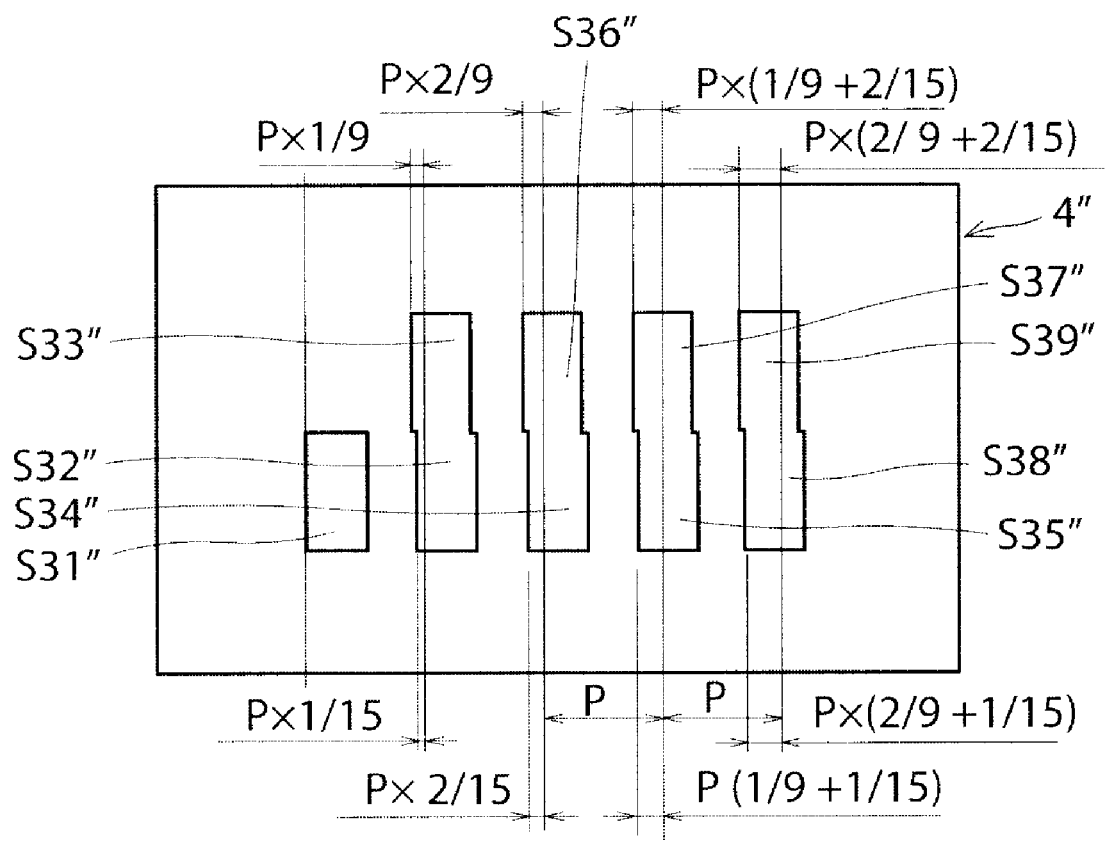
FIG. 4 is a plan view of a stationary slit plate in which a plurality of light transmissive slits are arranged in two slit rows disposed in the width direction orthogonal to the moving direction.

FIG. 4 shows a stationary slit plate 4" in which a plurality of second light transmissive slits are arranged in two second slit rows. The movable slit plate used for the stationary slit plate 4" may be the same as the movable slit plate used in the embodiment of FIGS. 1 and 2. In the stationary slit plate 4" according to the embodiment, nine second light transmissive slits S31" to S39" are arranged in two second light transmis-

TABLE 1

|   |    | \multicolumn{9}{c}{n'} | | | | | | | | |
|---|----|---------|-------|-------|-------|-------|-------|-------|-------|-------|
|   |    | 2       | 3     | 4     | 5     | 6     | 7     | 8     | 9     | 10    |
| n | 2  | (1.59%) | 0.93% | 0.71% | 0.61% | 0.54% | 0.52% | 0.51% | 0.51% | 0.50% |
|   | 3  | (1.71%) | 0.62% | 0.52% | 0.41% | 0.36% | 0.34% | 0.33% | 0.32% | 0.32% |
|   | 4  | 0.98%   | 0.58% | 0.30% | 0.32% | 0.20% | 0.19% | 0.18% | 0.18% | 0.18% |
|   | 5  | 0.42%   | 0.66% | 0.20% | 0.15% | 0.13% | 0.12% | 0.12% | 0.12% | 0.11% |
|   | 6  | 0.46%   | 0.34% | 0.36% | 0.15% | 0.12% | 0.11% | 0.11% | 0.10% | 0.10% |
|   | 7  | 0.41%   | 0.18% | 0.33% | 0.15% | 0.10% | 0.10% | 0.09% | 0.09% | 0.09% |
|   | 8  | 0.28%   | 0.16% | 0.16% | 0.25% | 0.10% | 0.09% | 0.09% | 0.09% | 0.08% |
|   | 9  | 0.26%   | 0.16% | 0.12% | 0.19% | 0.12% | 0.09% | 0.08% | 0.08% | 0.08% |
|   | 10 | 0.23%   | 0.13% | 0.10% | 0.10% | 0.08% | 0.08% | 0.08% | 0.08% | 0.08% |

(The distortion rate is the root mean square of the ratio of the harmonic-wave components up to the 27th harmonic wave to the fundamental-wave component.)

sive slit rows. In the example of FIG. 4, unlike the example of FIG. 3, two second light transmissive slit rows disposed in the vertical direction in the drawing (for example, the second light transmissive slits S39" and S38") are continuously formed. Each of the phase differences of the second light transmissive slits S31" to S39" is the same as the phase differences of the second light transmissive slits S31 to S39 shown in the embodiment of FIG. 2. In the example of FIG. 4, four second light transmissive slits S33", S36", S37", and S39" are disposed in the upper second light transmissive slit row in the drawing paper, and five second light transmissive slits S31", S32", S34", S35", and S38' are disposed in the lower second light transmissive slit row.

According to the embodiment of FIGS. 3 and 4, it is possible to employ a desired number S of second light transmissive slits while the number of the second light transmissive slits provided in the stationary slit plate in the moving direction is determined in accordance with the design constraint of optical encoders discussed above. It is also possible to obtain an output signal with a low distortion rate. Specifically, by using the stationary slit plate shown in FIG. 3 or 4, it is possible to produce a signal with the same distortion rate as a signal produced using a stationary slit plate in which the prime number is nine for second light transmissive slits or light receiving elements provided in the moving direction even when the prime number of such elements is three or five. It is a matter of course that the order of the second light transmissive slits in the horizontal and vertical directions in the drawing paper may be determined as desired to obtain the same effect. The same effect may also be obtained by providing a plurality of second light transmissive slits forming each second light transmissive slit row with such phase differences that make the intervals between the second light transmissive slits smaller or larger.

Figure 5:
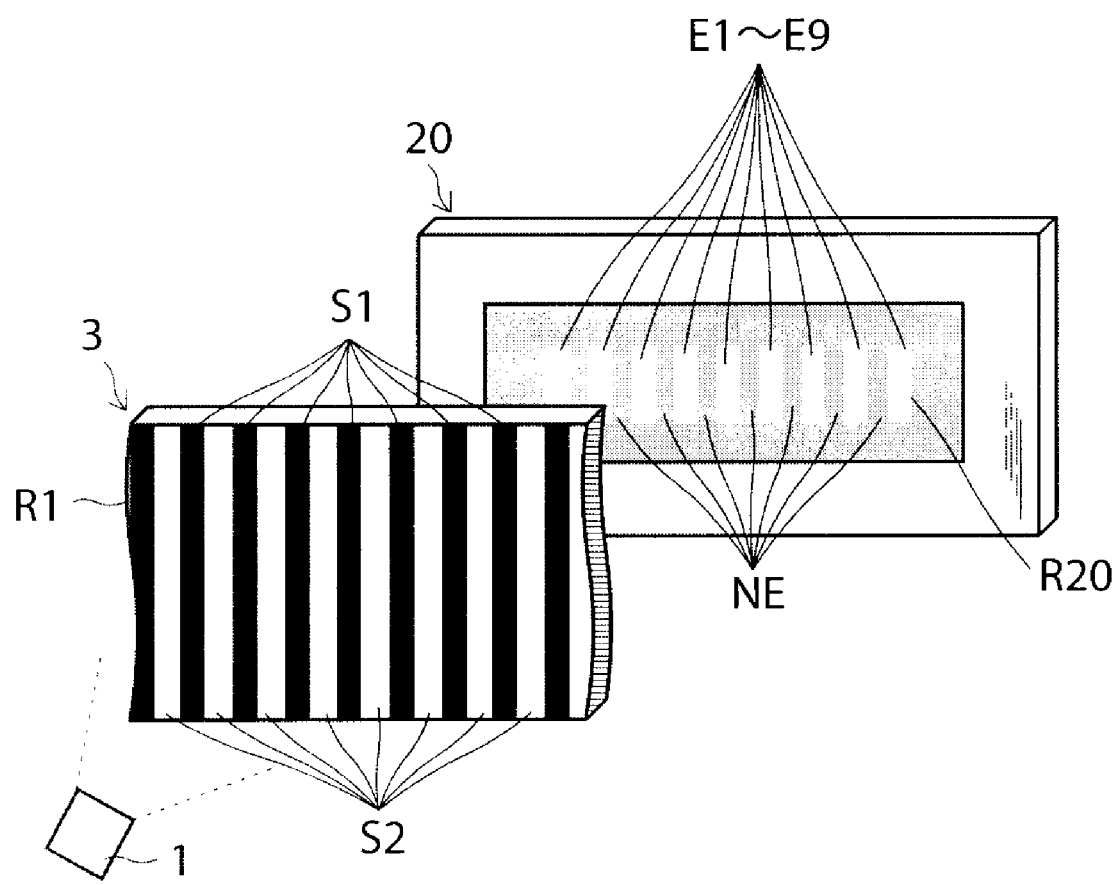
FIG. 5 schematically shows the configuration of an exemplary transmissive optical encoder device according to a second embodiment of the present invention.
Figure 6:
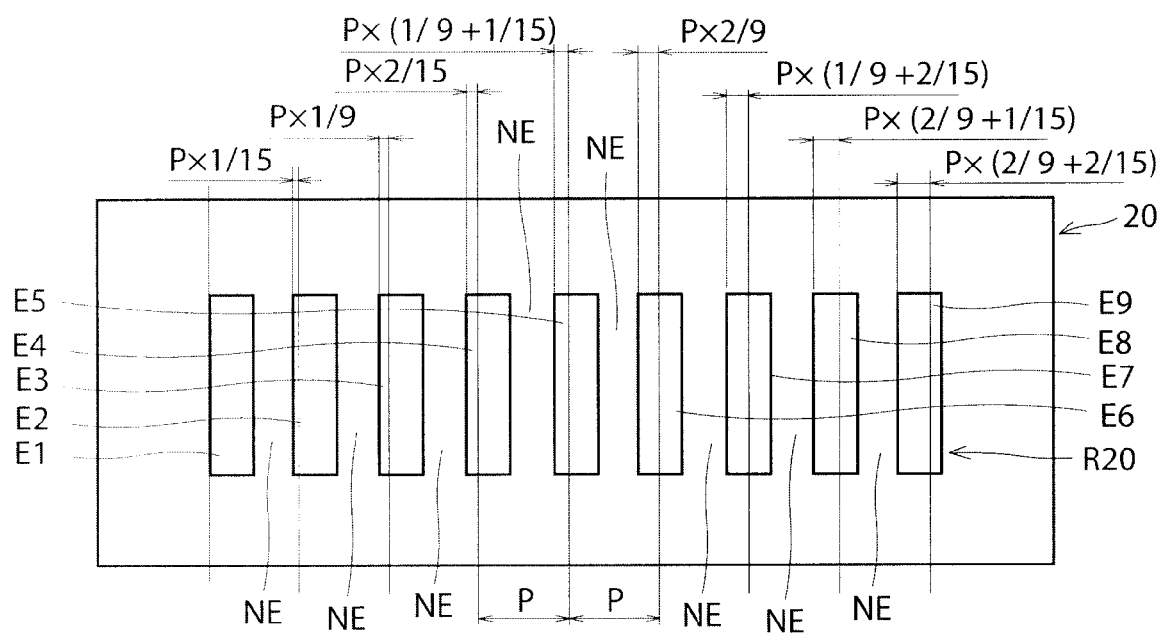
FIG. 6 shows an exemplary light receiving element array for use in the optical encoder device of FIG. 5.

FIG. 5 shows an exemplary configuration of a transmissive optical encoder device according to a second embodiment of the present invention. The transmissive optical encoder device of the second embodiment does not use a stationary slit plate unlike the transmissive optical encoder device of the first embodiment shown in FIGS. 1 and 2, but uses a plurality of light receiving elements E1 to E9 arranged in a pattern to provide the same effect as the transmissive optical encoder device of the first embodiment discussed above. The transmissive optical encoder device of the second embodiment includes a light emitting element 1, a movable slit plate 3, and a light receiving element array 20 including one light receiving element row R20. The movable slit plate includes a slit row R1 in which a plurality of light transmissive slits S2 each having a predetermined slit width, which transmit light from the light emitting element, and a plurality of light non-transmissive slits S1 each having a predetermined slit width are alternately formed in a moving direction of the movable slit plate at a constant pitch or cycle P. As shown in FIG. 6 as enlarged, the light receiving element array 20 includes one light receiving element row R20 in which a plurality of light receiving elements E1 to E9 and a plurality of portions NE where no light receiving elements exist are alternately formed. The light receiving elements E1 to E9 each have a predetermined pattern width and receive the light having been transmitted through the plurality of light transmissive slits S2. The portions NE where no light receiving elements exist each have a predetermined pattern width. Also, in the present embodiment, it is assumed that the number S of the plurality of light receiving elements (E1 to E9) in the light receiving element array 20 is S=n×n' where n is an integer of 2 or more and n' is an integer of 2 or more except for a combination of n=2 and n'=2 and a combination of n=3 and n'=2, the value of a is an integer of $0 \leqq a \leqq n-1$, and the value of b is an integer of $0 \leqq b \leqq n'-1$. Then, the plurality of light receiving elements (E1 to E9) are formed in the light receiving element array 20 such that when one of the light receiving elements (E1) of the light receiving element array 20 is optically coincident with one of the light transmissive slits in the movable slit plate 3, the remaining S-1 light receiving elements (E2 to E9) are shifted in position from other light transmissive slits corresponding to the remaining light receiving elements (E2 to E9) by S-1 phase differences represented by $P \times [a/(3 \times n) + b/(5 \times n')]$ where the value of a and the value of b are in different combinations.

Figure 7:
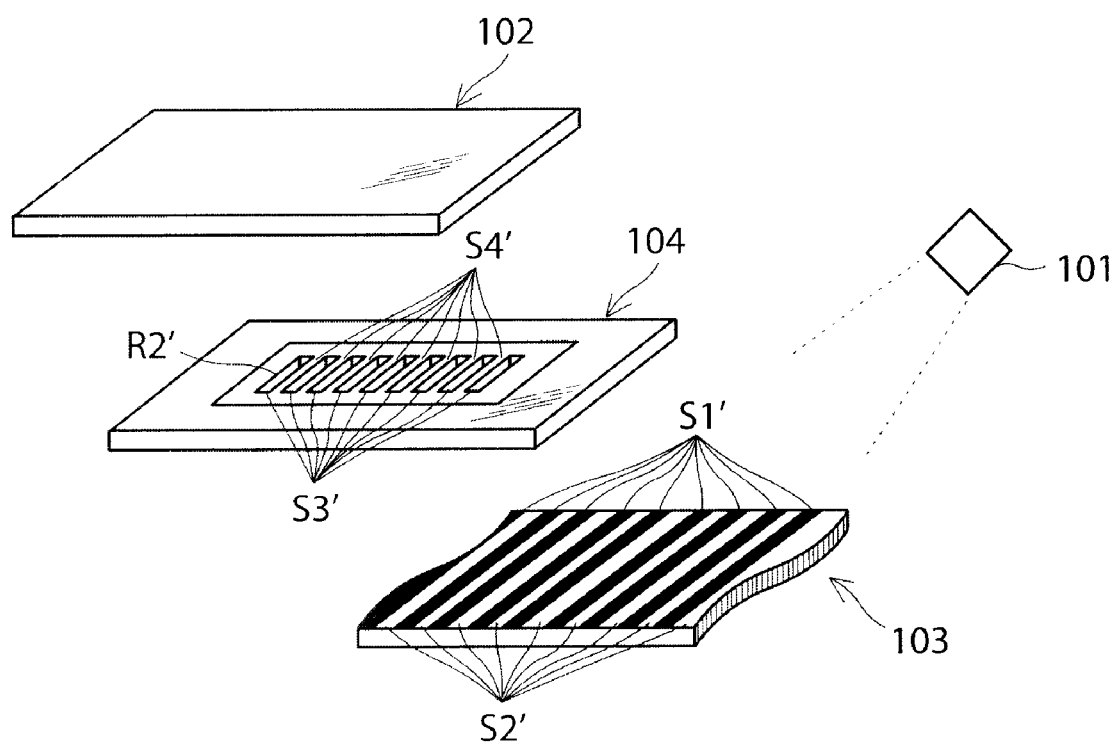
FIG. 7 schematically illustrates an exemplary reflective optical encoder device according to a first embodiment of the present invention.

While the present invention is applied to transmissive optical encoder devices in the above embodiments, it is a matter of course that the present invention is also applicable to reflective optical encoder devices. As shown in FIG. 7, a reflective optical encoder device of a first embodiment of the present invention includes a light emitting element 101, a light receiving element 102, a movable pattern plate 103, and a stationary slit plate 104. The movable pattern plate 103 is configured as follow: a plurality of reflective patterns S2' each having a predetermined pattern width are located at portions corresponding to the first light transmissive slits S2 in the first transmissive optical encoder device shown in FIG. 2 to reflect light from the light emitting element; a plurality of non-reflective patterns S1' each having a predetermined pattern width are located at portions corresponding to the first light non-transmissive slits S1 in the first transmissive optical encoder device shown in FIG. 2; and the reflective patterns S2' and the non-reflective patters S1' are alternately formed in a moving direction of the movable pattern plate at a constant pitch or cycle P'. The stationary slit plate 104 is disposed between the movable pattern plate 101 and the light receiving element 102, and includes one or more slit rows R2' in which a plurality of light transmissive slits S3' each having a predetermined slit width and a plurality of light non-transmissive slits S4' each having a predetermined slit width are alternately formed, as in the transmissive optical encoder device of the first embodiment shown in FIG. 2. Also, in the reflective optical encoder device of the first embodiment, the number S of the plurality of light transmissive slits formed in the stationary slit plate 104 is defined as S=n×n' where n is an integer of 2 or more and n' is an integer of 2 or more except for a combination of n=2 and n'=2 and a combination of n=3 and n'=2, the value of a is defined as an integer of $0 \leqq a \leqq n-1$, the value of b is defined as an integer of $0 \leqq b \leqq n'-1$, and the pitch of a plurality of optical images projected onto the stationary slit plate by the plurality of reflective patterns S2' in the movable pattern plate 103 is defined as P.

The plurality of light transmissive slits S3' are formed in the stationary slit plate 104 in the same way as the plurality of second light transmissive slits S31 to S39 formed in the stationary slit plate of FIG. 2. That is, the plurality of light transmissive slits S3' are formed in the stationary slit plate 104 such that when one of the light transmissive slits is optically coincident with one of the optical images projected by one of the reflective patterns in the movable pattern plate 103, the remaining S-1 light transmissive slits in the stationary slit plate 104 are shifted in position from other optical images projected by other reflective patterns corresponding to the remaining light transmissive slits by S-1 phase differences represented by $P \times [a/(3 \times n) + b/(5 \times n')]$ where the value of a and the value of b are in different combinations. The reflective optical encoder device of the first embodiment thus configured may also provide the same effect as the transmissive optical encoder device of the first embodiment. Also in this configuration, the one or more slit rows R2' may include a plurality of slit rows arranged in a width direction orthogonal to the moving direction.

Figure 8:
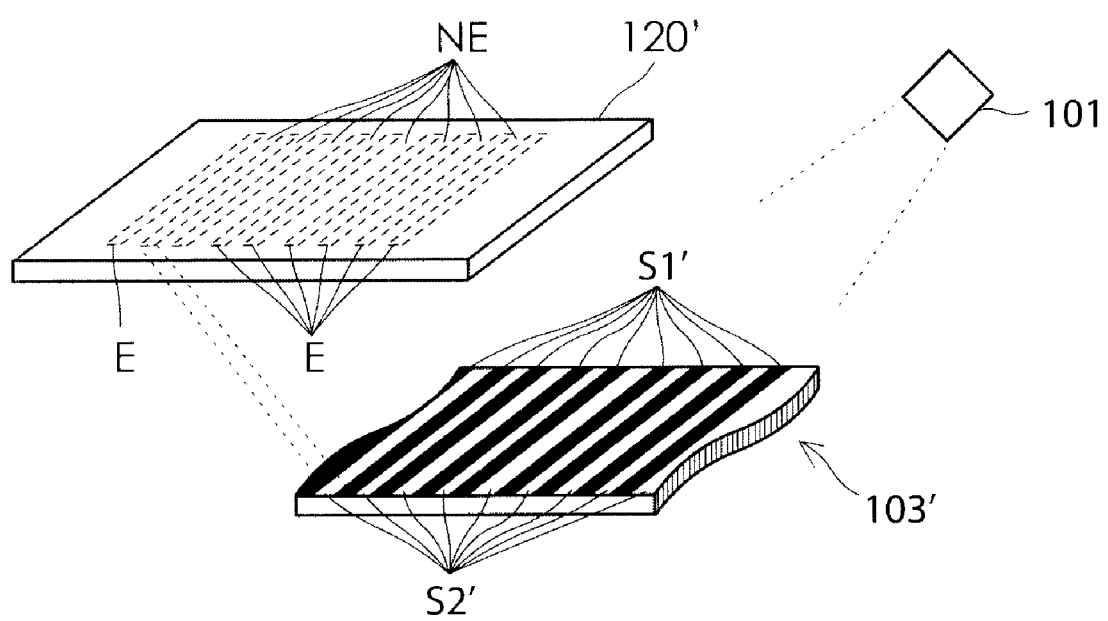
FIG. 8 schematically illustrates an exemplary reflective optical encoder device according to a second embodiment of the present invention.

A reflective optical encoder device of a second embodiment of the present invention does not use a stationary slit plate, but uses a light receiving element array including a plurality of light receiving elements arranged in a pattern to provide the same effect as the reflective optical encoder device of the first embodiment discussed above. As shown in FIG. 8, the reflective optical encoder device of the second embodiment uses a movable pattern plate 103' having the same structure as the movable pattern plate 103 used in the reflective optical encoder device of the first embodiment discussed above. The reflective optical encoder device of the second embodiment also uses a light receiving element array 120' having the same configuration as the light receiving element array 20, which is used in the transmissive optical encoder device of the second embodiment shown in FIGS. 5 and 6 and which includes the light receiving element row R20. The reflective optical encoder device of the second embodiment also uses may alternatively use a light receiving element array including a plurality of light receiving element rows arranged in a width direction orthogonal to the moving direction shown in FIG. 9. Also in the reflective optical encoder device of the second embodiment, the number S of the plurality of light receiving elements E in the light receiving element array is defined as S=n×n' where n is an integer of 2 or more and n' is an integer of 2 or more except for a combination of n=2 and n'=2 and a combination of n=3 and n'=2, the value of a is defined as an integer of 0≦a≦n−1, the value of b is defined as an integer of 0≦b≦n'−1, and the pitch of a plurality of optical images projected by the plurality of reflective patterns S2' in the movable pattern plate 103' onto a surface of the light receiving element array is defined as P. Then, the plurality of light receiving elements are formed in the light receiving element array 120' such that when one of the light receiving elements E is optically coincident with one of the optical images projected by one of the reflective patterns in the movable pattern plate, the remaining S-1 light receiving elements E in the light receiving element array 120' are shifted in position from other optical images projected by other reflective patterns corresponding to the remaining light receiving elements in the movable slit plate 103' by S-1 phase differences represented by P×[a/(3×n)+b/(5×n')] where the value of a and the value of b are in different combinations. NE designates portions where no light receiving elements exist.

Figure 9:
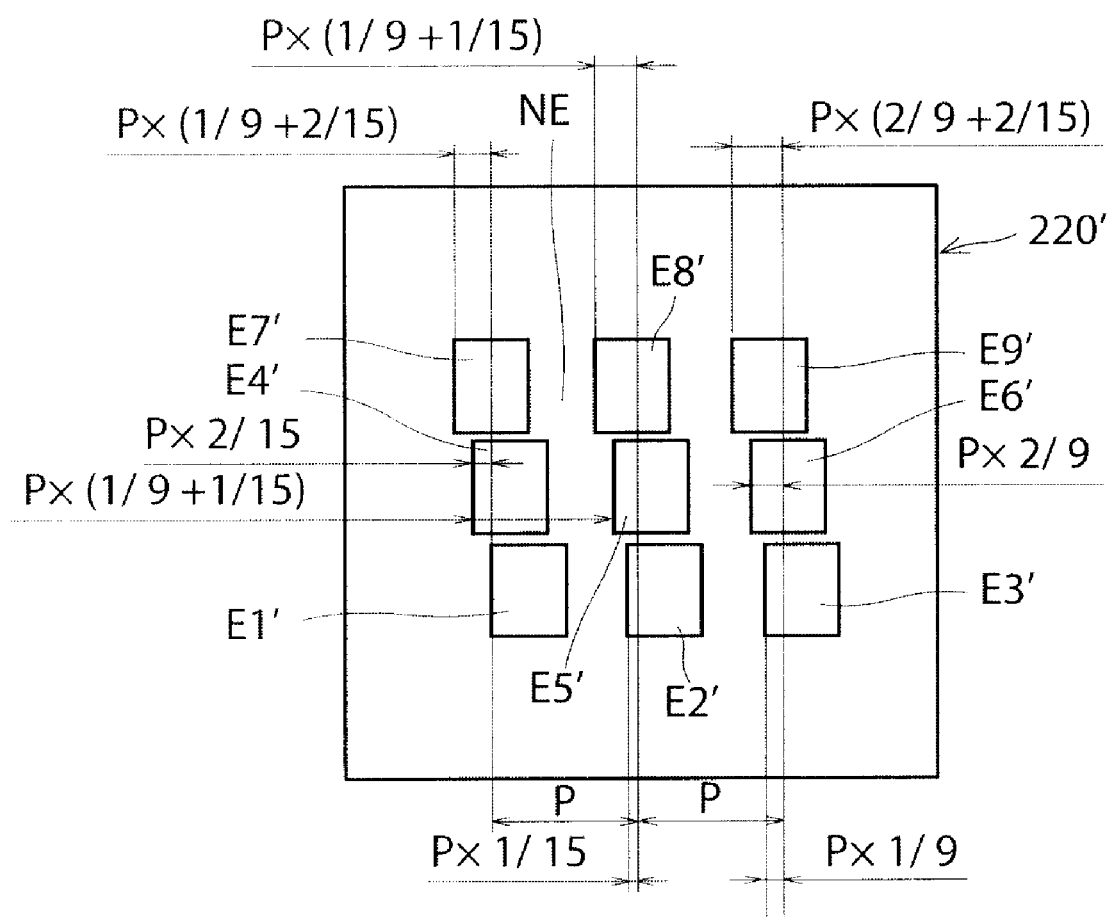
FIG. 9 shows an exemplary configuration in which a light receiving element array includes three light receiving element rows.

As shown in FIG. 9, reflective optical encoder devices may also use a light receiving element array 220' which includes a plurality of (in FIG. 9, three) light receiving element rows in which light receiving elements E1' to E9' and portions NE where no light receiving elements exist are alternately formed in a moving direction of the movable slit plate. In FIG. 9, three light receiving elements E7', E8', and E9' are arranged in the upper row, three light receiving elements E4', E5', and E6' are arranged in the middle row, and three light receiving elements E1', E2', and E3' are arranged in the lower row, as in the transmissive optical encoder device shown in FIG. 3. The light receiving element array 220' having the arrangement pattern of FIG. 9 may be used to obtain exactly the same effect as the transparent optical encoder device shown in FIG. 3. In addition, a light receiving element array 220' including three light receiving element rows shown in FIG. 9 may be used to obtain exactly the same effect as the transparent optical encoder device shown in FIG. 4.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. An optical encoder device comprising:
   a light emitting element;
   a light receiving element disposed to face the light emitting element;
   a movable slit plate disposed between the light emitting element and the light receiving element and including a first slit row in which a plurality of first light transmissive slits each having a predetermined slit width and a plurality of first light non-transmissive slits each having a predetermined slit width are alternately formed in a moving direction of the movable slit plate at a constant pitch P; and
   a stationary slit plate disposed between the light emitting element and the light receiving element and including one or more second slit rows in which a plurality of second light transmissive slits each having a predetermined slit width and a plurality of second light non-transmissive slits each having a predetermined slit width are alternately formed, wherein
   defining the number S of the plurality of second light transmissive slits formed in the stationary slit plate as S=n×n' where n is an integer of 2 or more and n' is an integer of 2 or more except for a combination of n=2 and n'=2 and a combination of n=3 and n'=2, the value of a as an integer of 0≦a≦n−1, and the value of b as an integer of 0≦b≦n'−1, the plurality of second light transmissive slits are formed in the stationary slit plate such that when one of the second light transmissive slits is optically coincident with one of the first light transmissive slits formed in the movable slit plate, the remaining S-1 second light transmissive slits are shifted in position from other first light transmissive slits corresponding to the remaining second light transmissive slits by S-1 phase differences represented by P×[a/(3×n)+b/(5×n')]where the value of a and the value of b are in different combinations.

2. The optical encoder device according to claim 1, wherein:
   the one or more second slit rows include a plurality of second slit rows arranged in a width direction orthogonal to the moving direction.

3. An optical encoder device comprising:
   a light emitting element;
   a movable slit plate including a slit row in which a plurality of light transmissive slits each having a predetermined slit width, which transmit light from the light emitting element, and a plurality of light non-transmissive slits each having a predetermined slit width are alternately formed in a moving direction of the movable slit plate at a constant pitch P; and
   a light receiving element array in which a plurality of light receiving elements each having a predetermined pattern width, which receive the light, which has been transmitted through the plurality of light transmissive slits, and a plurality of portions, where no light receiving elements exist, each having a predetermined pattern width are alternately formed, wherein
   defining the number S of the plurality of light receiving elements in the light receiving element array as S=n×n' where n is an integer of 2 or more and n' is an integer of 2 or more except for a combination of n=2 and n'=2 and a combination of n=3 and n'=2, the value of a as an integer of 0≦a≦n−1, and the value of b as an integer of 0≦b≦n'−1, the plurality of light receiving elements are formed in the light receiving element array such that when one of the light receiving elements is optically coincident with one of the light transmissive slits in the movable slit plate, the remaining S-1 light receiving elements are shifted in position from other light transmissive slits corresponding to the remaining light receiving elements by S-1 phase differences represented by $P\times[a/(3\times n)+b/(5\times n')]$ where the value of a and the value of b are in different combinations.

4. The optical encoder device according to claim 3, wherein:
the light receiving element array includes a plurality of light receiving element rows arranged in a width direction orthogonal to the moving direction.

5. An optical encoder device comprising:
a light emitting element;
a light receiving element;
a movable pattern plate including a reflective pattern row in which a plurality of reflective patterns each having a predetermined pattern width, which reflect light from the light emitting element, and a plurality of non-reflective patterns each having a predetermined pattern width are alternately formed in a moving direction of the movable pattern plate at a constant pitch P'; and
a stationary slit plate disposed between the movable pattern plate and the light receiving element and including one or more slit rows in which a plurality of light transmissive slits each having a predetermined slit width and a plurality of light non-transmissive slits each having a predetermined slit width are alternately formed, wherein
defining the number S of the plurality of light transmissive slits formed in the stationary slit plate as $S=n\times n'$ where n is an integer of 2 or more and n' is an integer of 2 or more except for a combination of n=2 and n'=2 and a combination of n=3 and n'=2, the value of a as an integer of $0\leq a\leq n-1$, the value of b as an integer of $0\leq b\leq n'-1$, and the pitch of a plurality of optical images projected onto the stationary slit plate by the reflection patterns in the movable pattern plate as P, the plurality of light transmissive slits are formed in the stationary slit plate such that when one of the light transmissive slits is optically coincident with one of the optical images projected onto the stationary slit plate by one of the reflective patterns in the movable pattern plate, the remaining S-1 light transmissive slits are shifted in position from other optical images projected by other reflective patterns corresponding to the remaining light transmissive slits by S-1 phase differences represented by $P\times[a/(3\times n)+b/(5\times n')]$ where the value of a and the value of b are in different combinations.

6. The optical encoder device according to claim 5, wherein:
the one or more slit rows include a plurality of slit rows arranged in a width direction orthogonal to the moving direction.

7. An optical encoder device comprising:
a light emitting element;
a movable pattern plate including a reflective pattern row in which a plurality of reflective patterns each having a predetermined pattern width, which reflect light from the light emitting element, and a plurality of non-reflective patterns each having a predetermined pattern width are alternately formed in a moving direction of the movable pattern plate at a constant pitch P'; and
a light receiving element array in which a plurality of light receiving elements each having a predetermined pattern width, which receive the light reflected from the plurality of reflective patterns, and a plurality of portions, where no light receiving elements exist, each having a predetermined pattern width are alternately formed in the moving direction, wherein
defining the number S of the plurality of light receiving elements in the light receiving element array as $S=n\times n'$ where n is an integer of 2 or more and n' is an integer of 2 or more except for a combination of n=2 and n'=2 and a combination of n=3 and n'=2, the value of a as an integer of $0\leq a\leq n-1$, the value of b as an integer of $0\leq b\leq n'-1$, and the pitch of a plurality of optical images projected onto a surface of the light receiving element array by the reflection patterns in the movable pattern plate as P, the plurality of light receiving elements are formed in the light receiving element array such that when one of the light receiving elements is optically coincident with one of the optical images projected by one of the reflective patterns in the movable pattern plate, the remaining S-1 light receiving elements are shifted in position from other optical images projected by other reflective patterns corresponding to the remaining light receiving elements by S-1 phase differences represented by $P\times[a/(3\times n)+b/(5\times n')]$ where the value of a and the value of b are in different combinations.

8. The optical encoder device according to claim 7, wherein:
the light receiving element array includes a plurality of light receiving element rows arranged in a width direction orthogonal to the moving direction.

9. The optical encoder device according to claim 1, wherein:
an output optical signal does not contain a third harmonic wave or a fifth harmonic wave.

10. The optical encoder device according to claim 1, further comprising:
a circuit that electrically multiplies an output optical signal.

11. The optical encoder device according to claim 2, wherein:
an output optical signal does not contain a third harmonic wave or a fifth harmonic wave.

12. The optical encoder device according to claim 3, wherein:
an output optical signal does not contain a third harmonic wave or a fifth harmonic wave.

13. The optical encoder device according to claim 4, wherein:
an output optical signal does not contain a third harmonic wave or a fifth harmonic wave.

14. The optical encoder device according to claim 5, wherein:
an output optical signal does not contain a third harmonic wave or a fifth harmonic wave.

15. The optical encoder device according to claim 6, wherein:
an output optical signal does not contain a third harmonic wave or a fifth harmonic wave.

16. The optical encoder device according to claim 7, wherein:
an output optical signal does not contain a third harmonic wave or a fifth harmonic wave.

17. The optical encoder device according to claim 8, wherein:
an output optical signal does not contain a third harmonic wave or a fifth harmonic wave.

18. The optical encoder device according to claim 2, further comprising:
a circuit that electrically multiplies an output optical signal.

19. The optical encoder device according to claim 3, further comprising:
a circuit that electrically multiplies an output optical signal.

20. The optical encoder device according to claim 4, further comprising:
a circuit that electrically multiplies an output optical signal.

* * * * *